US011163970B1

(12) United States Patent
Sammoura et al.

(10) Patent No.: US 11,163,970 B1
(45) Date of Patent: Nov. 2, 2021

(54) OPTICAL FINGERPRINT SYSTEM WITH VARYING INTEGRATION TIMES ACROSS PIXELS

(71) Applicant: Google LLC, Mountain View, CA (US)

(72) Inventors: Firas Sammoura, Dublin, CA (US); Jean-Marie Bussat, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/902,979

(22) Filed: Jun. 16, 2020

(51) Int. Cl.
*G06K 9/00* (2006.01)
*G06K 9/20* (2006.01)

(52) U.S. Cl.
CPC ....... *G06K 9/00013* (2013.01); *G06K 9/2027* (2013.01)

(58) Field of Classification Search
CPC .................. G06K 9/00013; G06K 9/2027
See application file for complete search history.

(56) References Cited

U.S. PATENT DOCUMENTS

| | | | |
|---|---|---|---|
| 5,077,803 A | 12/1991 | Kato et al. | |
| 5,852,670 A | 12/1998 | Setlak et al. | |
| 7,212,658 B2 | 5/2007 | Du et al. | |
| 9,412,002 B2 | 8/2016 | Magi | |
| 9,953,233 B2 | 4/2018 | Du et al. | |
| 10,116,868 B2 | 10/2018 | Wyrwas et al. | |
| 10,181,070 B2 | 1/2019 | Smith et al. | |
| 10,339,178 B2 | 7/2019 | Namjoon et al. | |
| 10,339,362 B2 | 7/2019 | Othman et al. | |
| 10,410,033 B2 | 9/2019 | He et al. | |
| 2002/0021827 A1* | 2/2002 | Smith | G06K 9/036 382/124 |
| 2008/0205713 A1* | 8/2008 | Nagashita | G06K 9/00013 382/124 |

(Continued)

FOREIGN PATENT DOCUMENTS

| | | |
|---|---|---|
| CN | 100375107 | 7/2006 |
| CN | 102262730 | 11/2011 |

(Continued)

OTHER PUBLICATIONS

"Fingerpring Matching", Handbook of Fingerprint Recognition 2nd Edition, Jan. 1, 2009, pp. 167-170, & 206.

(Continued)

*Primary Examiner* — John B Strege
(74) *Attorney, Agent, or Firm* — Colby Nipper PLLC

(57) ABSTRACT

Described is an optical fingerprint system with varying integration times across pixels. A sensor selects blocks of pixels contacted or covered by an input to a region of a display. While a matcher attempts to authenticate the input with first blocks of pixels captured by the sensor, the sensor captures additional blocks of pixels for subsequent authentication if the first blocks fail. With more time to integrate the light reflected off the input, each additional block of pixels include more detail than previously captured blocks. If authentication fails based on the first blocks, the matcher can reattempt authentication using the additional blocks without delay. Repeating this process enables the system to authenticate input using very large or high-resolution images while minimizing latency and power consumed to authenticate the input.

20 Claims, 10 Drawing Sheets

(56) References Cited

U.S. PATENT DOCUMENTS

| | | | |
|---|---|---|---|
| 2015/0135108 A1* | 5/2015 | Pope | G06F 3/0484 715/767 |
| 2015/0310251 A1 | 10/2015 | Wyrwas et al. | |
| 2016/0224819 A1 | 8/2016 | Kim et al. | |
| 2016/0253544 A1 | 9/2016 | Weber et al. | |
| 2017/0017824 A1 | 1/2017 | Smith et al. | |
| 2017/0169275 A1 | 6/2017 | Mackey et al. | |
| 2018/0012006 A1 | 1/2018 | Suh et al. | |
| 2018/0121699 A1* | 5/2018 | Zhang | G06K 9/0002 |
| 2018/0330147 A1 | 11/2018 | Kim et al. | |
| 2019/0026535 A1 | 1/2019 | Li et al. | |
| 2019/0034690 A1 | 1/2019 | Jung et al. | |
| 2019/0122024 A1* | 4/2019 | Schwartz | G06F 16/2365 |
| 2019/0237480 A1* | 8/2019 | Cheng | G09G 3/3225 |
| 2019/0303639 A1 | 10/2019 | He et al. | |
| 2019/0311176 A1 | 10/2019 | Hadded et al. | |
| 2020/0167542 A1 | 5/2020 | Hu et al. | |
| 2020/0380236 A1* | 12/2020 | He | G06F 3/044 |
| 2020/0394378 A1* | 12/2020 | Riehl | G06F 21/32 |
| 2021/0019491 A1* | 1/2021 | Hai | G06K 9/0004 |
| 2021/0063816 A1* | 3/2021 | He | G06F 21/32 |

FOREIGN PATENT DOCUMENTS

| | | |
|---|---|---|
| EP | 0359554 | 3/1990 |
| EP | 1993062 | 11/2008 |
| EP | 3249577 | 11/2017 |
| EP | 3376434 | 9/2018 |
| WO | 2008111994 | 9/2008 |
| WO | 2017143571 | 8/2017 |
| WO | 2021118578 | 6/2021 |
| WO | 20211692682 | 8/2021 |

OTHER PUBLICATIONS

"International Search Report and Written Opinion", Application No. PCT/US2019/066077, dated Sep. 16, 2020, 13 pages.

"International Search Report and Written Opinion", Application No. PCT/US2020/017745, dated Oct. 26, 2020, 18 pages.

Bae, et al., "Optical Fingerprint Sensor Based on a-Si:H TFT Technology", May 2018, 4 pages.

Kamada, et al., "OLED Display Incorporating Organic Photodiodes for Fingerprint Imaging", Journal of the Society for Information Display SID, Apr. 2019, 11 pages.

"International Search Report and Written Opinion", Application No. PCT/US2020/050137, dated Mar. 18, 2021, 13 pages.

Wang, et al., "User Authentication on Mobile Devices: Approaches, Threats and Trends", Jan. 21, 2021, 26 pages.

Sammoura, et al., "Latent Fingerprint Detection Using Rotationally-Invariant Vectors", Technical Disclosure Commons; Retrieved from https://www.tdcommons.org/dpubs_series/3241, May 19, 2020, 12 pages.

Sammoura, et al., "Safeguarding Biometric Authentication Systems from Fingerprint Spoof Attacks", Technical Disclosure Commons; Retrieved from https://www.tdcommons.org/dpubs_series/2769, Dec. 16, 2019, 13 pages.

Sammoura, et al., "Spoof Detection for Fingerprint Sensors", Technical Disclosure Commons; Retrieved from https://www.tdcommons.org/dpubs_series/2648, Nov. 5, 2019, 12 pages.

Sammoura, et al., "Spoof Detection in Optical Fingerprint Sensors Using Light Scattering", Technical Disclosure Commons; Retrieved from https://www.tdcommons.org/dpubs_series/3244, May 20, 2020, 10 pages.

Thakkar, "Fingerprint Reader Technology Comparison: Optical Fingerprint Scanner; Capacitive-based Fingerprint Reader and Multispectral Imaging Sensor", https://www.bayometric.com/fingerprint-reader-technology-comparison/accessed Aug. 21, 2019.

Yau, et al., "Fake Finger Detection by Finger Color Change Analysis", Institute for Infocomm Research, 21 Heng Mui Keng Terrace, Singapore, Nanyang Technological University, EEE, Singapore, 2007, 9 pages.

\* cited by examiner

OPTICAL FINGERPRINT SYSTEM WITH VARYING INTEGRATION TIMES ACROSS PIXELS

BACKGROUND

An optical fingerprint system may embed a monolithic sensor between a transparent screen and a region of pixels of a display. The pixels illuminate a user input from below a contact surface of the screen. The sensor collects light, which reflects off the user input and back under the screen. By integrating the light reflected by the input, the sensor generates an image, which undergoes signal processing before being evaluated by a matcher. The matcher authenticates the user input based on whether information (e.g., minutia) inferred from the image matches an enrolled image of a previously-authenticated user. Reliability and security of an optical fingerprint system improves by capturing and analyzing large or high-resolution images, which are too detailed to replicate or too difficult to spoof. Improved reliability and security may increase processing time and power consumption, which, however, fails to provide an excellent user experience, which can lead to disablement or abandonment of the sensor for authenticating users.

SUMMARY

This document describes an optical fingerprint system with varying integration times across pixels. A sensor selects blocks of pixels contacted or covered by an input to a region of a display. While a matcher attempts to authenticate the input with first blocks of pixels captured by the sensor, the sensor captures additional blocks of pixels for subsequent authentication if the first blocks fail. With more time to integrate the light reflected off the input, each additional block of pixels includes more detail than previously captured blocks. If authentication fails based on the first blocks, the matcher can reattempt authentication using the additional blocks without delay. Repeating this process enables the system to authenticate input using very large or high-resolution images while minimizing latency and power consumed to authenticate the input.

In some aspects a computing device includes: a display including a screen and a region of pixels configured to emit light to illuminate the screen; a fingerprint sensor configured to capture blocks of pixels within the region of pixels by integrating light reflected off an input at the screen; and a processor configured to: obtain first blocks captured by the fingerprint sensor after the fingerprint sensor integrates the light reflected off the input for a first amount of time; obtain additional blocks captured by the fingerprint sensor after the fingerprint sensor integrates the light reflected off the input for an additional amount of time since capturing the first blocks; and responsive to failing to authenticate the input based on a scoring of an enrolled fingerprint against the first blocks, authenticate the input based on scoring the enrolled fingerprint against the additional blocks obtained from the fingerprint sensor during authentication of the input from the first blocks.

In some aspects, a method is described including detecting, by a processor, an input at a display; responsive to detecting the input, illuminating, by the processor, a region of pixels of the display; obtaining, by the processor, first blocks of pixels captured by a fingerprint sensor after integrating light reflected off the input for a first amount of time; and authenticating, by the processor, the input based on scoring an enrolled fingerprint against the first blocks. The method further includes, during authentication of the first blocks, obtaining, by the processor, additional blocks of pixels captured by the fingerprint sensor after integrating the light reflected off the input for an additional amount of time; and responsive to failing to authenticate the input based on the scoring of the enrolled fingerprint against the first blocks, authenticating, by the processor, the input by scoring the enrolled fingerprint against the additional blocks already captured by the fingerprint sensor during the authentication of the first blocks.

This document also describes computer-readable media having instructions that when executed by one or more processors, cause a computing device to perform the above-summarized method. Other methods are set forth herein, as well as systems and means for performing the above-summarized and other methods.

Throughout the disclosure, examples are described where a computing system (e.g., a user device) analyzes information (e.g., fingerprint images) associated with a user or a user device. The computing system uses the information associated with the user after the computing system receives explicit permission from the user to collect, store, or analyze the information. For example, in situations discussed below in which a user device authenticates a user based on fingerprints, the user will be provided with an opportunity to control whether programs or features of the user device or a remote system can collect and make use of the fingerprint for an initial or subsequent authentication procedure. Individual users, therefore, have control over what the computing system can or cannot do with fingerprint images and other information associated with the user. Information associated with the user (e.g., an enrolled image), if ever stored, is pre-treated in one or more ways so that personally identifiable information is removed before being transferred, stored, or otherwise used. For example, before a user device stores an enrolled image (also referred to as "a fingerprint template"), the user device encrypts the enrolled image. Pre-treating the data this way ensures the information cannot be traced back to the user, thereby removing any personally identifiable information that would otherwise be inferable from the data. Thus, the user has control over whether information about the user is collected and, if collected, how such information may be used by the computing system.

This summary is provided to introduce simplified concepts for optical fingerprint sensing by varying integration times across pixels, which are further described below in the Detailed Description and Drawings. For ease of description, the disclosure focuses on optical fingerprint capturing and matching. However, the techniques are not limited to authentication of images of some or all of a person's hands or palms; the techniques also apply to other forms of image based authentication, including authentication based on images of an eye or other part of a face. This summary is not intended to identify essential features of the claimed subject matter, nor is it intended for use in determining the scope of the claimed subject matter.

BRIEF DESCRIPTION OF THE DRAWINGS

The details of one or more aspects of an optical fingerprint system with varying integration times across pixels are described in this document with reference to the following drawings. The same numbers are used throughout the drawings to reference like features and components:

FIG. 5-1 illustrates an integration circuit that enables authentication of inputs at an optical fingerprint sensor with vary integration times across pixels.

FIG. 5-2 illustrates timing diagrams to show electrical and timing characteristics of the integration circuit of FIG. 5-1.

FIGS. 7-1 and 7-2 combine to illustrate an example method performed by a user device that authenticates user input using an optical fingerprint sensor with varying integration times across pixels.

DETAILED DESCRIPTION

Some fingerprint detection systems can waste time and resources collecting and processing fingerprint images in their entirety. For example, time spent integrating light from pixels may need to be increased to improve image quality or to reduce noise in an image produced from a scan. People with a very dry or moist finger, a light touch, or other characteristics to their inputs require more time to capture and authenticate. To improve reliability or security, some fingerprint detection systems include larger or higher resolution fingerprint sensors, although this often substantially increases image collection and processing times. An input to a large-area sensor may require a lot of energy to illuminate with pixel light for a sufficient amount of time to capture and authenticate the input. To promote security and discourage use of less-efficient and less-secure, but often quicker, authentication systems, consider an example optical fingerprint system shown in FIG. 1.

Figure 1:
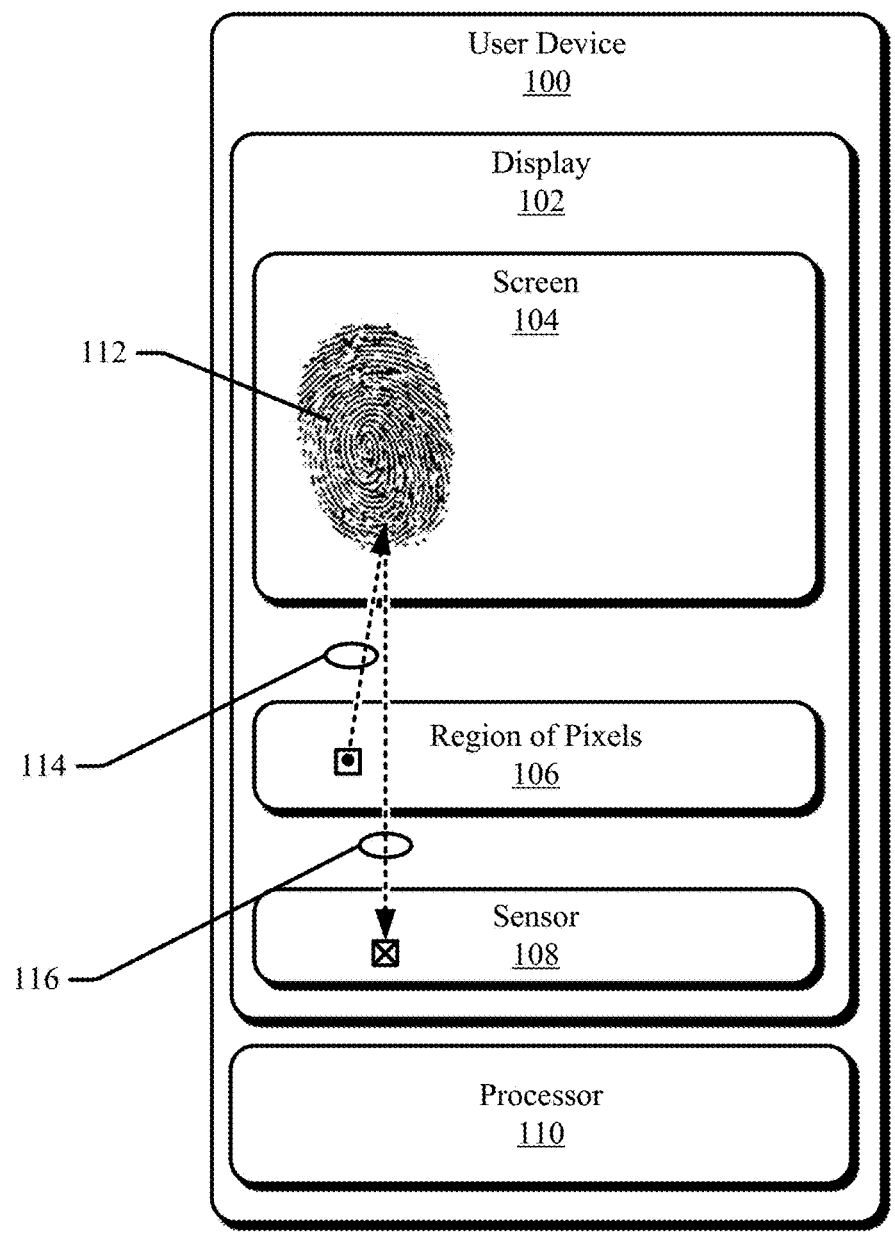
FIG. 1 illustrates an example user device that authenticates user input using an optical fingerprint sensor with varying integration times across pixels.

FIG. 1 illustrates a user device 100 encompassing some or all of an optical fingerprint system. The user device 100 implements an optical fingerprint system, which authenticates user inputs contacting or covering a contacting surface of a display 102, using an optical fingerprint sensor 108 (or simply "sensor 108") to capture and collect fingerprint images by varying integration times across pixels. Authenticating fingerprint images occurs faster with the user device 100; a reduction in latency comes from the user device 100 being configured to iteratively match blocks of a fingerprint image, even while light reflected by an input is still being integrated at these and other blocks, until an authentication threshold is achieved. The user device 100 does not wait for integration to occur across all pixels. Instead, the user device 100 samples blocks of pixels while continuing to integrate light reflected off an input at each of the other pixels.

The display 102 is shown having a screen 104 and a region of pixels 106 positioned beneath the screen 104. In some cases, the display 102 comprises an organic light emitting diode (OLED) display. Each pixel in the region of pixels 106 may represent an individually controllable light source including one or more OLEDs. The region of pixels 106 automatically activates when inputs to the user device 100 contact or overlay the screen 104. While primarily described as an OLED display, the display 102 may be any device configured to illuminate, sufficient for optical based fingerprint authentication, a finger, a palm, a hand, or other input contacting or covering the display 102.

The display 102 includes the region of pixels 106, including an array of pixels or portion thereof. Each pixel in the array is configured as a light source positioned beneath or on an opposite side of a contacting surface of the screen 104, which is a surface contacted or covered by inputs to the display 102.

The sensor 108 can be embedded within the display 102 or may be a separate component of the user device 100, in either case the sensor 108 is arranged between the screen 104 and the region of pixels 106. Being wholly or partially embedded, positioned, arranged, or otherwise located between the screen 104 and the region of pixels 106 enables the user device 100 to illuminate a user input 112 when the user input 112 covers or contacts the screen 104. To penetrate the sensor 108 from below, the sensor 108 is configured to allow light 114 emitted by the region of pixels 106 to pass beyond the sensor 108 and onto the screen 104.

When a user input 112 contacts the screen 104, the region of pixels 106 activates to emit the light 114 from below the screen 104. When projected from below the screen 104 and towards the user input 112, the light 114 illuminates the user input 112, which causes reflected light 116 to reflect off the user input 112 and back towards the region of pixels 106.

The sensor 108 generates blocks of pixels captured during the integration for subsequent authentication by the sensor 108 (not shown in FIG. 1) or a processor of the user device 100, such as a processor 110. For example, the sensor 108 is configured to integrate over a period of time the light 116 reflected off the user input 112 as the light 114 illuminates the user input 112 from beneath the screen 104. As the reflected light 116 is integrated over the period of time, the sensor 108 captures respective blocks of pixels for authenticating the user input 112. The sensor 108 outputs blocks of pixels captured for an initial interval in the period of time while capturing blocks of pixels captured for a subsequent interval in the period of time.

The region of pixels 106 has a level of brightness that increases with each successive interval in the period of time, making authentication of the user input 112 easier the longer the reflected light 116 is integrated. Rather than wait until the user input 112 is fully illuminated, the sensor 108 captures and outputs blocks of pixels to be evaluated while the brightness of the region of pixels 106 is still increasing. The sensor 108 does this repeatedly until the processor 110 authenticates the user input 112 from the captured blocks, which over time include more detail from having been captured under brighter conditions. The processor 110 may fail an authentication after a time-out is reached (e.g., the region of pixels 106 reaches peak luminosity), an interruption occurs (e.g., the processor 110 switches to authentication using a password or passcode), or the authentication otherwise fails.

The processor 110 is operatively coupled to the display 102, including the screen 104 and the region of pixels 106, and the sensor 108, which is embedded or integrated within the display 102. The processor 110 configures the sensor 108 to capture and process only as much data as the processor 110 needs to authenticate the input 112, and without necessarily processing all the blocks of an entire image of the input 112. The processor 110 directs the sensor 108 and the display 102 to capture and process blocks of pixels, which are partial images of the user input 112, in a consistently short amount of time. The amount of time the processor 110 takes to authenticate the user input 112 can vary for many reasons, however, this amount of time is not dependent on increases to a size or resolution of the sensor 108. Time spent by the processor 110 directing the display 102 and the sensor 108 to perform authentication is consistently held brief, from one user input to the next, even if the sensor 108 is reconfigured to acquire larger or higher-resolution images.

The processor 110 is configured to obtain first blocks captured by the sensor 108 after the sensor 108 integrates the light 116 reflected off the user input 112 for a first amount of time (e.g., one tenth of a second) since the display 102 began illuminating the region of pixels 106. While authenticating the user input 112 based on scoring an enrolled fingerprint against the first blocks, the processor is configured to obtain additional blocks captured by the sensor 108 after integrating the light 116 reflected off the user input 112 for an additional amount of time (e.g., an additional tenth of a second) since capturing the first blocks.

The increments of time (or intervals) during which the light 116 is allowed to reflect off the user input 112 before capturing blocks can be steady or these intervals can vary. The sensor 108 can capture blocks at a fraction of a second (e.g., one tenth of a second) or in some applications, longer. In other cases, the intervals vary by increasing or decreasing from one capture to the next. In some examples, the sensor 108 can use a combination of constant and varying intervals. The sensor 108 may initially capture blocks using steady intervals but switch to capturing blocks after longer or shorter intervals of time.

The intervals can be associated with different brightness levels of the region of pixels 106, as opposed to or in addition to being intervals of time. That is, after a first interval, the region of pixels 106 may be at a minimum brightness level and after each subsequent interval, the region of pixels 106 is at a greater brightness level than the previous interval. The sensor 108 captures first blocks after the first interval when the region of pixels 106 illuminates to a first level of brightness and the sensor 108 captures additional blocks when after the second interval the region of pixels 106 illuminates to a greater level of brightness than the first level of brightness.

Up to this point, the techniques involve capturing and authenticating blocks in parallel. Parallel processing can minimize latency from image-based biometric authentication, for some implementations. Still other systems capture and authenticate blocks serially, where a single group of blocks is captured and then authenticated before another group of blocks is captured. While overall parallel capturing and authenticating may achieve a maximum reduction in latency, serially capturing and authenticating can still keep latency contained, despite increases to image size or resolution. The sensor 108 and the processor 110 may be configured to serially capture and then authenticate a group of blocks prior to capturing and authenticating additional groups of blocks. Serially capturing and authenticating blocks of images may enable the processor 110 or the sensor 108 to perform some other task, for example, executing instructions to vary a graphical user interface appearing on the screen 104 of the display 102.

This way, the user device 100 authenticates the user input 112 while containing authentication times within an acceptable limit, unlike other fingerprint systems that take longer to authenticate biometric images, particularly when large-area or high-resolution sensors are used to capture the images. If the integration of an entire image starts at time zero, then at time one, some blocks of pixels may be captured and authenticated. At time two, additional blocks of pixels are captured, in some cases, while the first blocks are being authenticated. Because they are captured later in time since integration began, the additional blocks have a greater integration time than an integration time of the first blocks, and likely include greater detail than the first blocks as well. In this way, the user device 100 is configured to authenticate user inputs using an optical fingerprint sensor with varying integration times across pixels.

Figure 2:
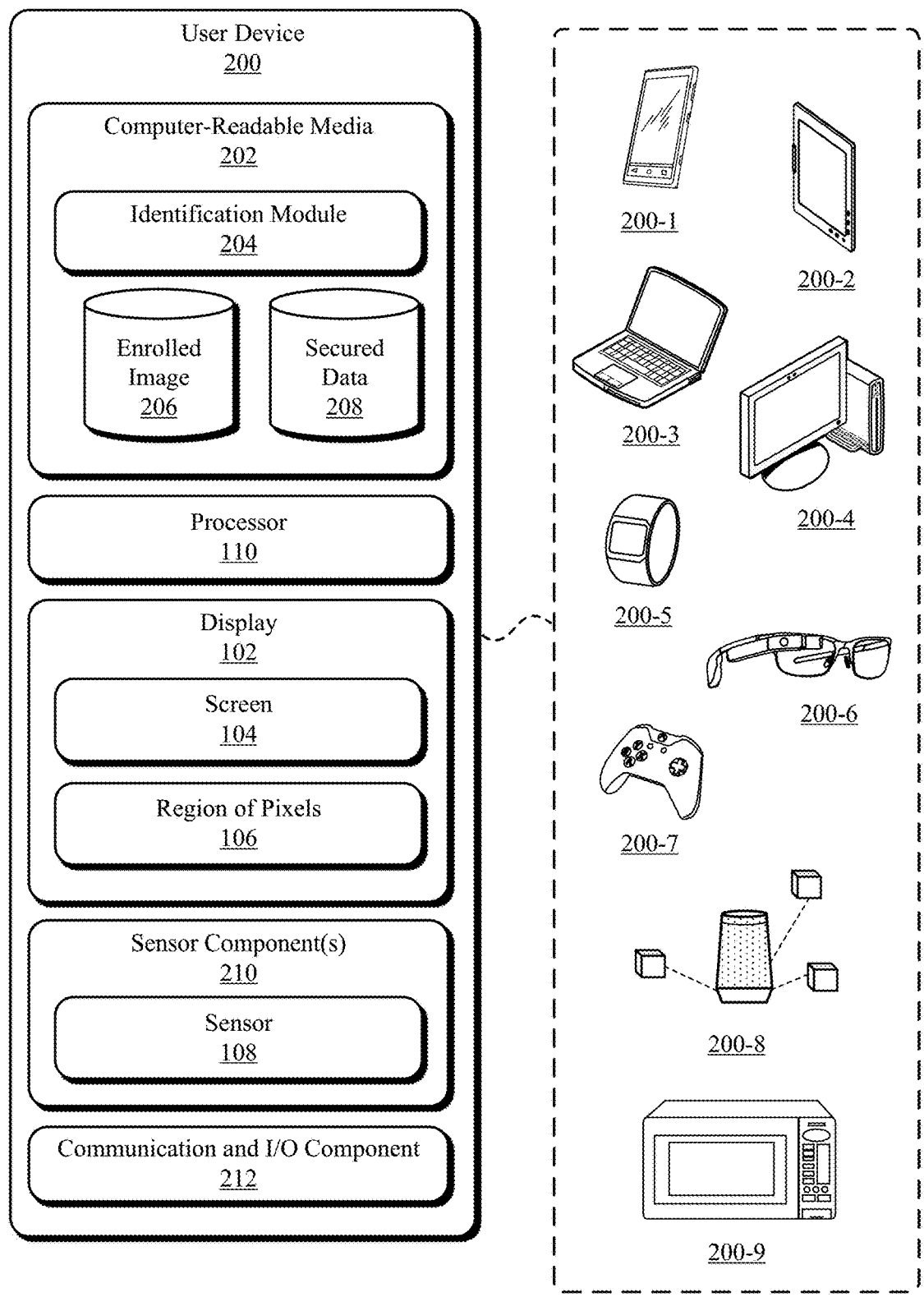
FIG. 2 illustrates another example user device that authenticates user input using an optical fingerprint sensor with varying integration times across pixels.

FIG. 2 illustrates user device 200 as another example user device that authenticates user input using an optical fingerprint sensor 108 with varying integration times across pixels. The user device 200 is an example of the user device 100 set forth in FIG. 1. FIG. 2 shows the user device 200 as being a variety of example devices, including a smartphone 200-1, a tablet 200-2, a laptop 200-3, a desktop computer 200-4, a computing watch 200-5, computing eyeglasses 200-6, a gaming system or controller 200-7, a smart speaker system 200-8, and an appliance 200-9. The user device 200 can also include other devices, such as televisions, entertainment systems, audio systems, automobiles, unmanned vehicles (in-air, on the ground, or submersible "drones"), trackpads, drawing pads, netbooks, e-readers, home security systems, doorbells, refrigerators, and other devices with a fingerprint identification system.

The user device 200 includes one or more computer-readable media 202, and one or more sensor components 210. The user device 200 further includes one or more communication and input/output (I/O) components 212, which can operate as an input device and/or an output device, for example, presenting a GUI at the display 102 and receiving inputs directed to the GUI on the display 102.

The one or more computer-readable media 202 include an identification module 204, an enrolled image 206, and secured data 208. In addition to the identification module 204, other programs, services, and applications (not shown) can be implemented as computer-readable instructions on the computer-readable media 202, which can be executed by the processor 110 to provide functionalities described herein.

The processor 110 and the computer-readable media 202, which include memory media and storage media, are the main processing complex of the user device 200. The sensor 108 is included as one of the sensor components 210. The display 102 may be part of or separate from the one or more communication and I/O components 212.

The processor 110 may include any combination of one or more controllers, microcontrollers, processors, microprocessors, hardware processors, hardware processing units, digital-signal-processors, graphics processors, graphics processing units, and the like. The processor 110 may be an integrated processor and memory subsystem (e.g., implemented as a "system-on-chip"), which processes computer-executable instructions to control operations of the user device 200.

The computer-readable media 202 is configurable for persistent and non-persistent storage of executable instructions (e.g., firmware, software, applications, modules, programs, functions) and data (e.g., user data, operational data, online data) to support execution of the executable instructions. Examples of the computer-readable media 202 include volatile memory and non-volatile memory, fixed and removable media devices, and any suitable memory device or electronic data storage that maintains executable instructions and supporting data. The computer-readable media 202 can include various implementations of random-access memory (RAM), read-only memory (ROM), flash memory, and other types of storage memory in various memory device configurations. The computer-readable media 202 excludes propagating signals. The computer-readable media 202 may be a solid-state drive (SSD) or a hard disk drive (HDD).

In addition to the sensor 108, the sensor components 210 include other sensors for obtaining contextual information (e.g., sensor data) indicative of operating conditions (virtual or physical) of the user device 200 or the user device 200's surroundings. The user device 200 monitors the operating conditions based in part on sensor data generated by the sensor components 210. In addition to the examples given for the sensor 108 to detect fingerprints, other examples of the sensor components 210 include various types of cameras (e.g., optical, infrared), radar sensors, inertial measurement units, movement sensors, temperature sensors, position sensors, proximity sensors, light sensors, infrared sensors, moisture sensors, pressure sensors, and the like.

The communication and I/O component 212 provides connectivity to the user device 200 and other devices and peripherals. The communication and I/O component 212 includes data network interfaces that provide connection and/or communication links between the device and other data networks, devices, or remote systems (e.g., servers). The communication and I/O component 212 couples the user device 200 to a variety of different types of components, peripherals, or accessory devices. Data input ports of the communication and I/O component 212 receive data, including image data, user inputs, communication data, audio data, video data, and the like. The communication and I/O component 212 enables wired or wireless communicating of device data between the user device 200 and other devices, computing systems, and networks. Transceivers of the communication and I/O component 212 enable cellular phone communication and other types of network data communication.

The identification module 204 directs the sensor 108 and the processor 110 to integrate, over a period of time, the light 116 reflecting off the input 112 to the region of pixels 106. This enables the sensor 108 to capture initial blocks of pixels at an initial interval in the period of time, while simultaneously outputting previous blocks captured at previous intervals in the period of time. The sensor 108 may output blocks to the identification module 204 directly, or indirectly by storing the blocks of the secured data 208. The identification module 204 matches the blocks received from the sensor 108 against portions of the enrolled image 206.

In response to receiving an indication that the screen 104 or the sensor 108 detects the user input 112 at the region of pixels 106, the identification module 204 obtains blocks of pixels captured by the sensor 108 at different intervals in a period of time. Without waiting for all the blocks to be captured, the identification module 204 scores the captured blocks against different blocks of the enrolled image 206. As the identification module 204 directs the sensor 108 to capture additional blocks for a subsequent interval, the identification module 204 compiles the scores of the individual blocks already captured in the previous intervals, and generates from those scores, a confidence value associated with the user input 112. In some cases, prior to capturing all the blocks of the user input 112, and as soon as the confidence satisfies a threshold, the identification module 204 automatically matches the user input to the enrolled image 206, affirmatively authenticating the user input.

In response to the identification module 204 authenticating the input, an application or operating system may grant the user access to information stored at or otherwise accessible from the user device 200, such as the secured data 208.

Otherwise, the identification module 204 outputs an indication that authentication of the input 112 failed, and the user is restricted from having access to the user device 200.

Figure 3:
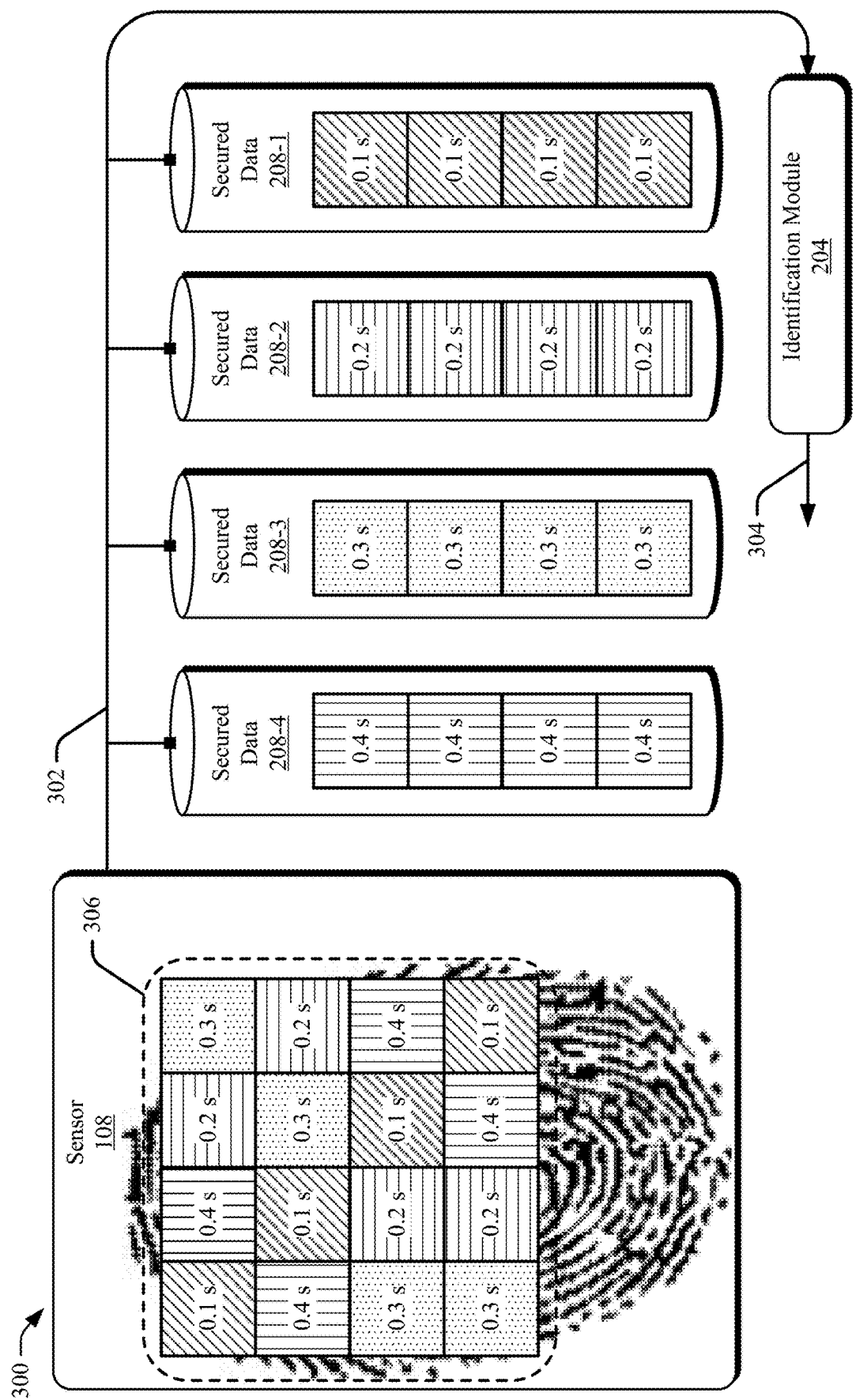
FIG. 3 illustrates an example transfer of data between the optical fingerprint sensor and an identification module of the user device from FIG. 2.

FIG. 3 illustrates an example transfer of data 300 between the optical fingerprint sensor 108 and the identification module 204 of the user device 200 from FIG. 2. FIG. 3 shows the identification module 204 receiving an input 302, which corresponds to an output from the sensor 108. The identification module 204 processes the input 302 and generates output 304, for example, an indication of whether the input 112 detected at the display 102 matches the enrolled image 206 of an authorized user.

The input 302 to the identification module 204 includes separate chunks or groups of blocks 306 captured by the sensor 108 at different times. These blocks 306 are output by the sensor 108 as secured data 208-1 through 208-4. The secure data 208-1 is output to the identification module 204 first, with a first integration time. The secure datas 208-2 through 208-4 are output sequentially, with a second integration time, a third with a third integration time, and so forth.

Each of the blocks 306 is a group of pixels with a size (e.g., 31×31, 10×10) dependent on the resolution of the sensor 108 and the matching capability of the identification module 204. The grouping of pixels for any of the blocks 306 may be selected randomly or be pre-determined. The blocks 306 can be overlapping, so that some pixels are found in multiple blocks. The pixels in each of the blocks 306 may be co-located in a pixel array of the sensor 108, or the pixels can be dispersed evenly or unevenly throughout the pixel array. Each chunk of data that the sensor 108 outputs as the secured data 208-1 through 208-4 includes an equal or approximately equal quantity of the blocks 306.

The secured data 208-1 includes the blocks 306 of the user input 112 captured by the sensor 108 after one hundred milliseconds of integration time; for example, when the region of pixels 106 illuminates to a first level of brightness. The secured data 208-2, 208-3, and 208-4 include the blocks 306 of the user input 112 captured by the sensor 108 as the sensor 108 is allowed more time to illuminate the input 112, and therefore, more time to integrate the light 116 reflecting therefrom. Each additional group of blocks is captured by the sensor 108 when the region of pixels 106 in the display 102 is at a greater degree of brightness than when a previous group of blocks was captured.

The blocks captured by the sensor 108 are received by the identification module 204 at different intervals of time. The amount of time between consecutive pairs of the secured data 208-1, 208-2, 208-3, and 208-4 may be approximately equal, e.g., one hundred milliseconds apart. In other examples, the amount of time between consecutive outputs of the secured data 208-2, 208-3, and 208-4 is greater than or less than the amount of time between two other consecutive outputs. The pixels in each of the blocks 306 are accessed in a deterministic way because they are used to create a portion of an image of a user input. The pixels in the blocks 306 may overlap, or put another way, two or more of the blocks 306 may include one or more of the same pixels. The quantity of the blocks 306 output at each interval of integration time, as the secured data 208-1 through 208-4, can be selected according to the matching capability of the identification module 204. While the sensor 108 is integrating, the identification module 204 is matching. The number of the blocks 306 output at a time by the sensor 108 can depend on the latency of the matching.

Between each receipt of the secured data 208, the identification module 204 authenticates the input 112 using blocks captured up to that point. For example, the identification module 204 can attempt authentication of the input 112 immediately in response to receiving the first blocks in the secured data 208-1. The sensor 108 is configured to repeatedly capture further blocks during this authentication attempt. Responsive to failing to authenticate the input 112 based on the scoring of the enrolled fingerprint 206 against the first blocks, the identification module 204 can immediately attempt authentication based on the additional blocks already received as the secured data 208-2. The identification module 204 repeatedly attempts to authenticate the input 112 based on scoring the enrolled fingerprint 206 against captured blocks, and while still receiving additional captured blocks of the input 302.

Figure 4:
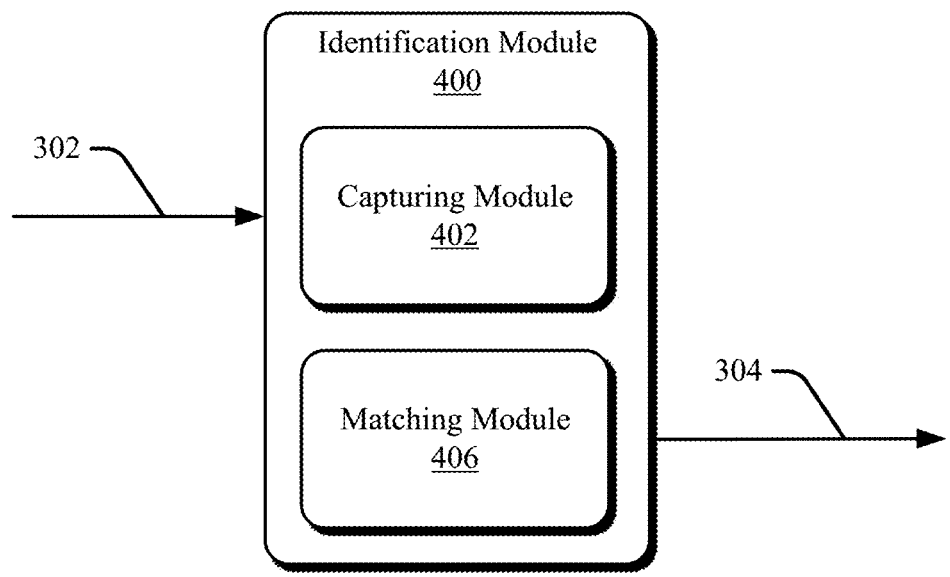
FIG. 4 illustrates an example identification module that authenticates user input using data from an optical fingerprint sensor with varying integration times across pixels.

FIG. 4 illustrates an example identification module 400 that authenticates user input using data from an optical fingerprint sensor with varying integration times across pixels. The identification module 400 includes a capturing module 402 and a matching module 406. The identification module 400 receives blocks of pixels as input 302 and generates as output 304 data indicating whether the input 302 includes a sufficient quantity of blocks matching corresponding blocks of an enrolled image, such as the enrolled image 206.

The capturing module 402 receives blocks of pixels output by the sensor 108 at different intervals during an integration period when the sensor 108 is illuminating an input. While the capturing module 402 receives blocks of pixels for an initial interval, the sensor 108 continues to capture additional blocks of pixels for each subsequent interval. To this end, the capturing module 402 receives a respective group of blocks for each interval in an integration period of the sensor 108.

The matching module 406 attempts to match the output from the capturing module 402 to the enrolled image 206. Instead of waiting for the capturing module 402 to receive blocks of pixels, which completely define the input 112 to the region of pixels 106, the matching module 406 immediately scores previously captured blocks against blocks of the enrolled image 206, and the scores R are tracked while new blocks M are received by the capturing module 404 for a subsequent interval in time. The matching module 406 determines, based on the confidences and scores R associated with the individual blocks P, an overall composite score S and confidence C associated with the user input 112 matching the enrolled image 206.

The matching module 406 uses the highest-ranking block scores to produce the overall score S indicating whether the fingerprint matches the enrolled image 206. The matching module 406 maintains the confidence C in the overall score S and the confidence C increases as the confidence in the highest-ranking individual block scores also increase. As more blocks are captured and matched, the confidence C in the overall image score grows. The matching module 406 determines whether or not the confidence C satisfies a confidence threshold for matching the fingerprint image to the enrolled image 206. Rather than wait for the screen 104 to reach maximum brightness, or for the capturing module 402 to receive all the blocks for the region of pixels 106, the input 112 is authenticated as soon as the score S and its confidence C satisfy their respective thresholds. This enables parallel capturing and matching of different parts of the input 112 without increasing complexity and in some cases, with reduced latency.

Figures 1, 5:
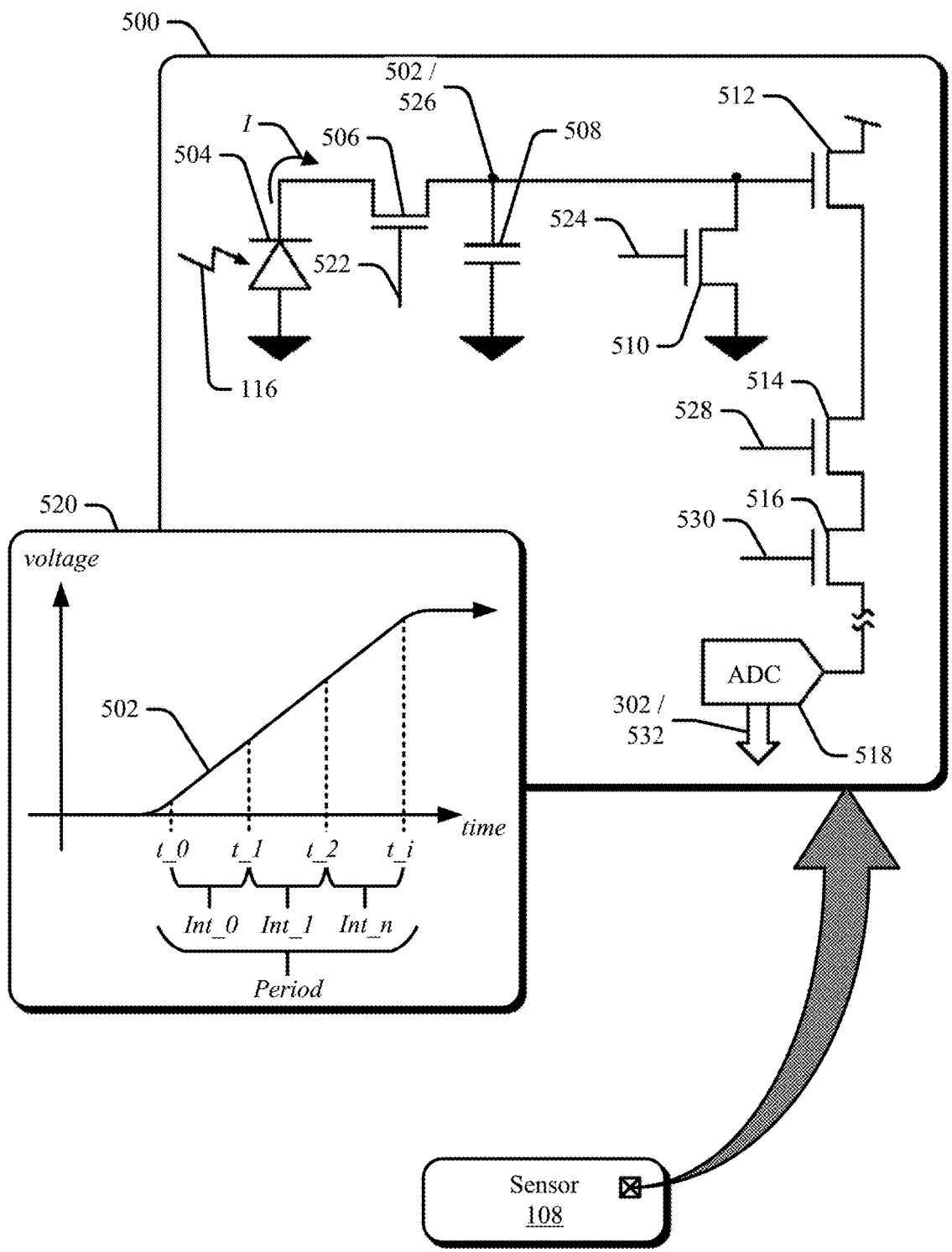
Figures 2, 5:
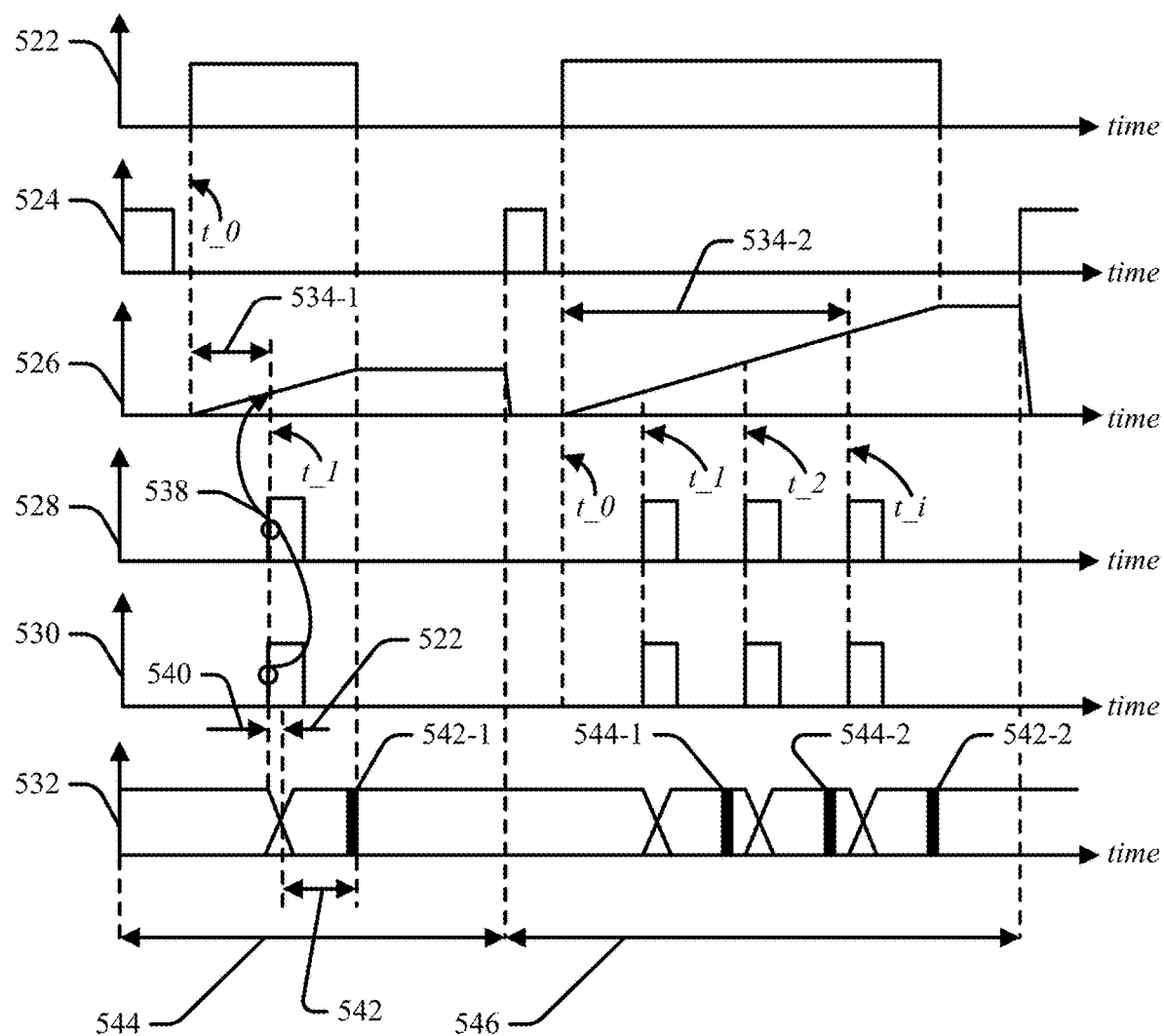

FIG. 5-1 illustrates an integration circuit 500 that enables authentication of inputs at an optical fingerprint sensor with varying integration times across pixels. FIG. 5-2 illustrates timing diagrams 522, 524, 526, 528, 530, and 532, which together convey timing and electrical characteristics of the integration circuit 500.

For each pixel or group of one or more pixels in the region of pixels 106, the sensor 108 includes the integration circuit 500. The integration circuit 500 includes a capacitor 508 and a photodiode 504, which are aligned with one or more corresponding pixels in the region of pixels 106. A voltage 502 of the capacitor 508 over a time period is shown in a graphical inlay 520 of FIG. 5-1. The time period includes intervals $Int\_1$ through $Int\_n$, which are bounded by integration times $t\_0$ through $t\_i$. FIG. 5-2 shows as some examples, time periods 544 and 546.

The photodiode 504 is configured to receive the light 116 reflected by the user input 112, for example, when the user input 112 contacts or covers the display 102. The photodiode 504 outputs a current I based on the light 116. The capacitor 508 is switchably connected to the photodiode 504 via an integration switch 506. The integration switch 506, when enabled, conducts the current I output from the photodiode 504 and delivers it to the capacitor 508. The capacitor 508 is configured to integrate or accumulate energy based on the current I. Enabling the integration switch 506 charges the capacitor 508 with energy derived from the current I being output by the photodiode 504. Disabling the integration switch 506 decouples the capacitor 508 from the photodiode 504 to prevent the capacitor 508 from being charged. For example, the timing diagram 522 in FIG. 5-2 includes two pulses where the integration switch 506 is enabled. Each of the pulses in the timing diagram 522 is aligned with the integration time $t\_0$ of either the period 544 or the period 546.

The integration circuit 500 further includes a reset switch 510. When enabled, the reset switch 510 shorts the capacitor 508. The reset switch 510 is enabled briefly at the start of the period 544 or 566 to dissipate the energy previously stored by the capacitor 508. As shown by comparing the timing diagram 522 with the timing diagram 524, the integration switch 506 is enabled in each of the periods 544 and 546 after the reset switch 510 is disabled. In some examples, (as shown) the reset switch 510 is disabled for a short amount of time required to discharge the capacitor 508. The reset switch 510, when enabled, configures the sensor 108 to discharge the capacitor 508. The integration switch 506, when enabled after the capacitor 508 is discharged, causes the sensor 108 to integrate the light 116 reflected off the input 112 by charging the capacitor 508 with energy derived from the current I output by the photodiode 504. The reset switch 510 can be controlled via an interrupt or time-out signal to reset the capacitor 508 for a subsequent authentication in response to the display 102 detecting the user input 112.

The integration circuit 500 further includes an output transistor 512. The output transistor 512 is configured to output a signal as an indication of the voltage 502, which is the voltage of the capacitor 508. The inlay diagram 520 and the timing diagram 526 show the voltage 502 over the periods 544 and 546.

Signal output from the output transistor 512, which is the indication of the voltage 502, is received by an analog-to-digital converter (ADC) 518, which generates image data. The image data is shown by the timing diagram 532 (e.g., the image data derived from the timing diagram 532 corresponds to the input 302 to the identification module 204, from FIG. 3). The coupling between the output transistor 512 and the input to the ADC 518 is controlled by switches 514 and 516, which in the example of FIG. 5-1 are a pair of row and column select switches. One of the switches 514 or 516 is enabled when the sensor 108 enables a row select signal associated with the integration circuit 500 and the other of the two switches 514 or 516 is enabled in response to a column select signal being enabled. The switches 514 and 516 are enabled as shown in the timing diagrams 528 and 530 to provide the ADC 518 with the indication of the voltage 502 when the sensor 108 outputs a block including a pixel or pixel group addressable by the row and select switches 514 and 516.

A read-out 542-1, 544-1, 542-2, or 544-2 of the ADC 518 is shown in the timing diagram 532. The ADC 518 can do a conversion of the signal output from the output transistor 512 to provide image data including, for each pixel or integration circuit 500, a digital value representing the intensity of the light 116 that is collected by the photodiode 504. The read-outs 542-1 and 542-2 represent times when the image data output from the ADC 518 is of sufficient quality to authenticate the user input 112 and the read-outs 544-1 and 544-2 indicate the opposite is true.

The processor 110 obtains blocks from the sensor 108, each of which include a collection of read-out values recorded from the ADC 518. The collection of read-out values for a block can include one for each integration circuit 500 associated with a group of pixels represented by that block. For example, during the period 544, the processor 110 obtains blocks of image data from the sensor 108 by determining the voltage 502 of the capacitor 508 from each integration circuit 500 defined by the blocks. The voltage 502 is determined after the sensor 108 integrates the light 116 reflected off the input 112 for a first amount of time 534-1 since the display 102 began illuminating the region of pixels 106. The time 534-1 is less than the period 544 and represents the first interval Int_1 shown in the inlay diagram 520. This, the first interval, is bounded by the integration times t_0 and t_1.

The integration time for each charge interval Int_1 through Int_n of the capacitor 508 can be adjusted and determined based on the size of the capacitor 508 or the length of the periods 544 or 546. This integration time can also be based on the conversion time of the ADC 518, including the time it takes for data to flow from the ADC 518 to a processor of the sensor 108 or the processor 110, for signal processing. Locations 538 illustrate in the timing diagrams 528 and 530 where the ADC 518 is sampled. The period 544 corresponds to an integration period of the sensor 108 where the identification module 204 authenticates the user input 112 after processing the image data obtained from the first and only integration interval Int_1. Contrast the period 544 with the period 546, which is an example where the identification module 204 authenticates the user input 112 after processing the image data obtained from the first three integration intervals Int_1, Int_1, and so forth.

During the period 546, all the pixels in the region of pixels 106 are receiving the light 116 reflecting off the user input 112, at approximately the same time. Each of the photodiodes 504 in the integration circuits 500 in the region of pixels 106 receives the light 116 to charge a corresponding capacitor 508, simultaneously.

The ADC 518 can be shared between multiple integration circuits to reduce costs and complexity. For example, the ADC 518 can be assigned to each column or each row of pixels in the region of pixels 106. The ADC 518 is configured to serially provide a read-out for each row when the column associated with the ADC 518 is selected along with that row, for example.

Authentication takes longer during the period 546 than it did in the period 544, the integration time 534-1 is shorter than an integration time 534-2, which is made clear by the three intervals, as opposed to just one, bounded by the time t_i. In the period 546, if the identification module 204 fails to authenticate the user input 112 because the quality of the images represented by the blocks acquired in the first place (e.g., the read-out 544-1) is not sufficient to match an enrolled image, the sensor 108 is ready to provide additional blocks at the integration time t 2. Again, the identification module 204 fails to authenticate the user input 112 based on the additional blocks received during the next interval (e.g., the read-out 544-2) and again deems the image data to be insufficient for matching against the enrolled image. By the integration time t 3, additional charge has been accumulated, so the ratio of usable signals to noise in the read-out 542-2 may be higher than either the read-outs 544-1 or 544-2, so potentially, the identification module 204 has a better image for comparisons.

Figure 6:
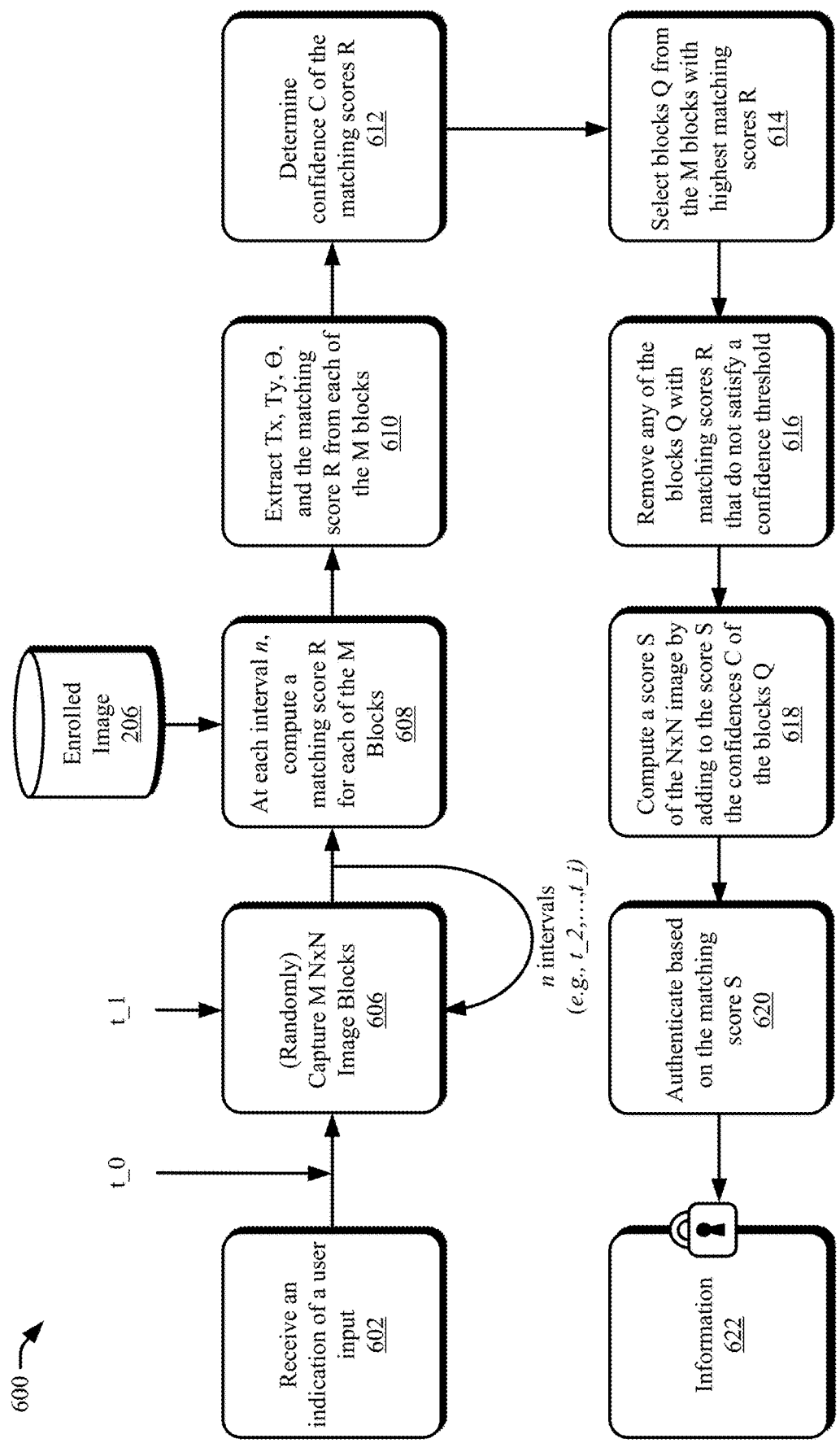
FIG. 6 illustrates an example logic-flow diagram of the identification module of FIG. 4.

FIG. 6 illustrates an example logic-flow diagram 600 of the identification module 400 of FIG. 4. The logical operations of the identification module 400 are organized in stages 602 through 620, and if successful in authenticating an input, the stages culminate in obtaining access to information at stage 622.

At stage 602, the capturing module 402 receives an indication of the user input 112 at the sensor 108. Rather than direct the sensor 108 to capture the entire user input 112, the sensor 108 randomly or deterministically captures only some blocks M of the user input 112. The user input 112 at the sensor 108 triggers the display 102 to illuminate the region of pixels 106 at time t_0, and the capturing module 402 captures blocks M of the user input at stage 606, initially at time t_1 (after the first interval Int_1 in an integration period). The stage 606 is repeated by the capturing module 402 for each of the n intervals in the integration period.

While the stage 606 is repeated, at stage 608 the capturing module 402 computes an individual matching score R for each of the blocks M, based on the enrolled image 206. At stage 608, the capturing module 402 outputs the matching scores R for the blocks M to be used by the matching module 406 for fingerprint identification.

At stage 610, the matching module 406 receives the output from the capturing module 402 and extracts Tx, Ty, Θ, and the matching score R from each of the blocks M. Consider, the angular rotation around center points of two blocks (one block from an image of the user input 112 and one block from the enrolled image 206) in Cartesian coordinates $(I_{1x}, I_{1y})$ and $(I_{2x}, I_{2y})$, each of which, respectively, transforms into a translation along the theta (Θ) direction in the polar coordinate representation—this is called "phase shifting." FFTs assume periodic boundary conditions. As such, a Rotationally invariant Absolute-value Fast Fourier Transforms (AFFT) of one block represented in polar coordinates is rotationally invariant, and the rotation angle is the location of the maximum correlation between the Fast Fourier Transform (FFT) of the two blocks, represented in polar coordinates.

The rotational and translation matrices, where the rotation and translation matrix between each of the M blocks and a block of the enrolled image 206 is represented as:

$$(\cos(\phi)\sin(\phi) - T_x - \sin(\phi)\cos(\phi) - T_y\, 0\, 0\, 1) \quad \text{(Equation 1)}$$

In the Equation 1, φ represents the angle between the center points $(I_{1x}, I_{1y})$ and $(I_{2x}, I_{2y})$, in Cartesian coordinates for the images represented by the two blocks, Tx represents the translation along the x-axis between the two blocks, and Ty represents the translation along the y-axis between the two blocks.

The x-coordinates and the y-coordinates can be transformed into the coordinate system of image 206 using Equation 2.

$$(x'y'1)=(\cos(\phi)\sin(\phi)-T_x-\sin(\phi)\cos(\phi)-T_y 0\ 0\ 1)(x\ y1) \quad \text{(Equation 2)}$$

Furthermore, the rotation matrix between the blocks, herein called $RM_{12}$, is the inverse of the rotation matrix between the blocks, herein called $RM_{21}$, as shown in Equation 3.

$$RM_{12}=(RM_{21})^{-1} \quad \text{(Equation 3)}$$

At stage 612, the matching module 406 determines a confidence C of the matching scores R. The rotation and translation vector candidates [Tx, Ty, φ] are subjected to a random sample consensus (RANSAC) voting process to determine a correlation/matching score between the matching blocks. The higher the number of votes, the greater the correlation/matching score, and the greater the confidence C. A table or other data structure can be used by the matching module 406 to maintain the highest-ranking translation and rotation vectors. The matching module 406 sorts the translation vectors using the correlation/matching scores within the ranked table. The matching module 406 groups multiple matching blocks M with the closest rotation and translation vectors into bins of blocks Q.

The matching module 406 selects the blocks with the highest matching scores R at stage 614. At stage 616, the matching module 406 discards the blocks with matching scores or confidences that do not satisfy a confidence threshold.

At stage 618, the matching module 406 computes a composite score S and confidence C for the blocks of the input 112, based on the scores R and confidences of the highest-ranking blocks. The matching module 406 selects from a ranked table, the highest quantity of matching blocks Q and extracts a final translational and rotation vector [Tx, Ty, 0] for the user input 112. The final translational and rotation vector is calculated as the average of the rotation and translation vectors of all the matching blocks Q.

At stage 620, the matching module 406 outputs a successful authentication if the total quantity of votes of the highest-scoring blocks is greater than a threshold, granting access to information at stage 622.

Figures 1, 7:
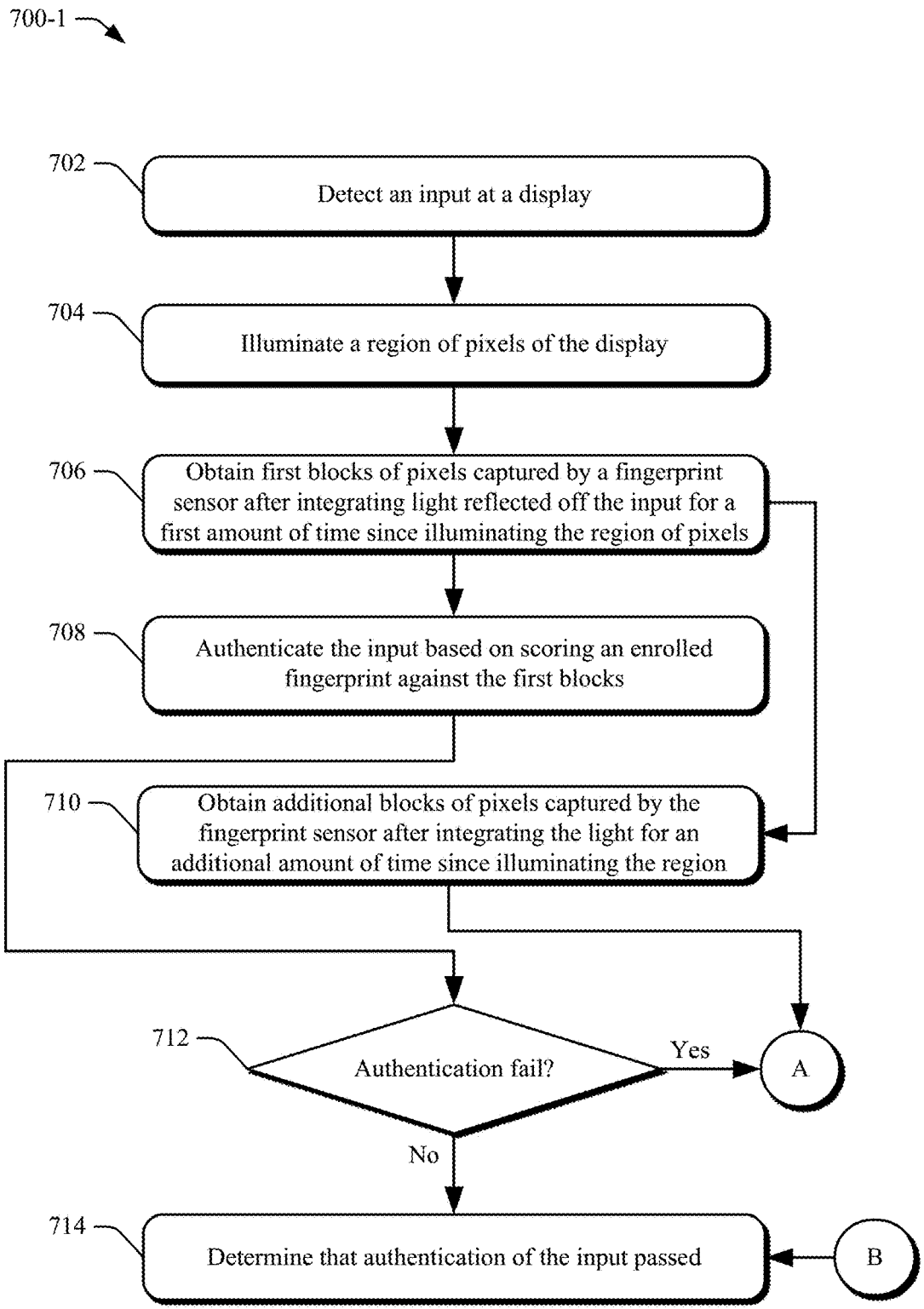
Figures 2, 7:
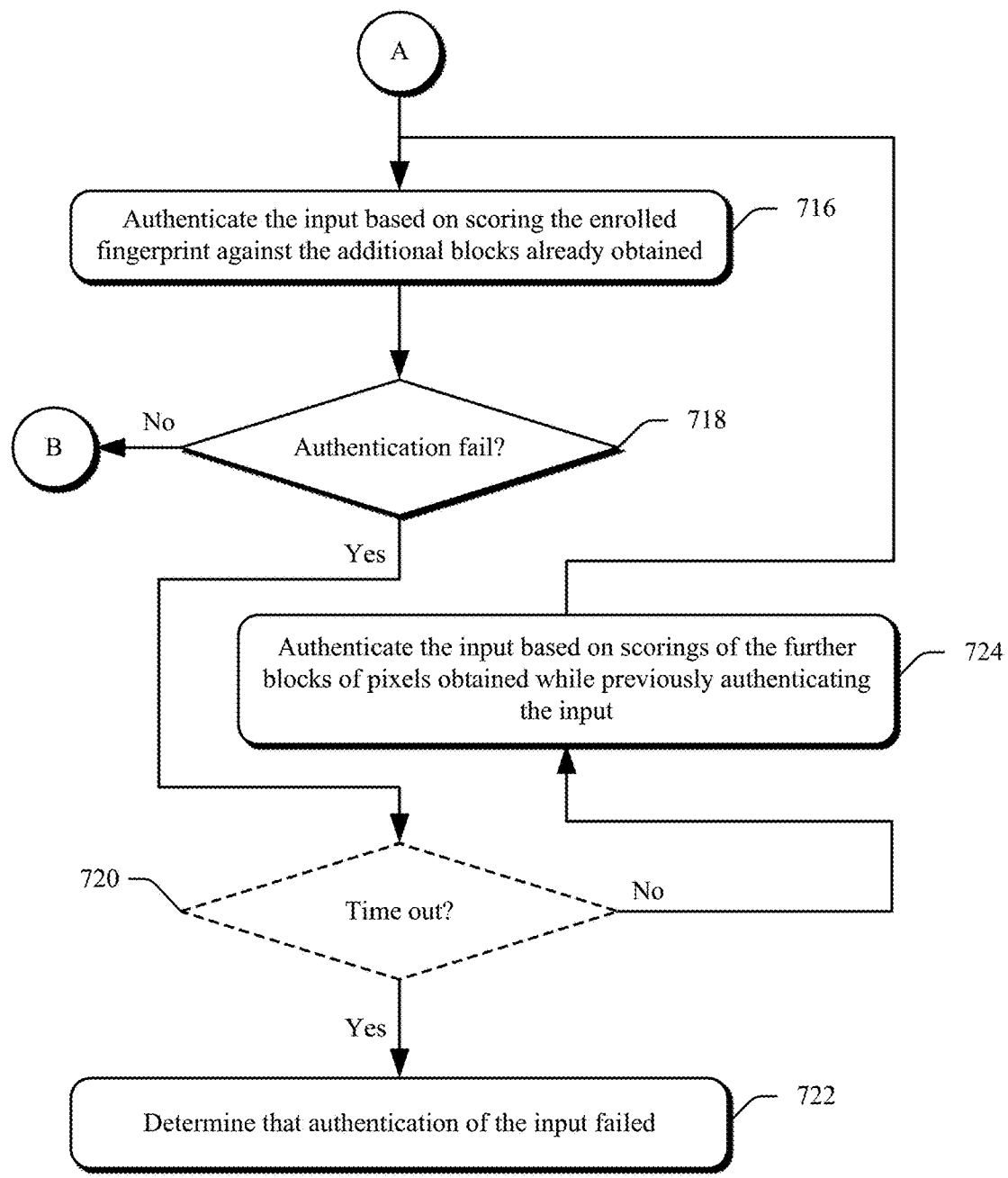

FIGS. 7-1 and 7-2 combine to illustrate an example method, including operations 700-1 and 700-2, performed by a user device that authenticates user input using an optical fingerprint sensor with varying integration times across pixels. The operations 700-1 and 700-2 may be performed in a different order or with additional or fewer stages than what is shown in FIGS. 7-1 and 7-2.

At 702, a processor of a user device detects an input at a display. The user device 100 wakes up the processor 110 based on a signal output from the display 102, in response to the user input 112 nearing the screen 104, for example.

At 704, responsive to detecting the input, the processor illuminates a region of pixels of the display. For instance, the processor 110 can cause the display 102 to begin automatically illuminating the region of pixels 106 in and around where the user input 112 contacts the screen 104. The region of pixels 106 emit the light 116 that reaches the user input 112 and reflects back to the sensor 108 as the light 116. The photodiode 504 is configured to output current I based on a portion of the light 116 reflected off the input 112, while the capacitor 508 is configured to charge from the current I. Before stage 706, the processor 110 may cause the sensor 108 to discharge the capacitor 508. After resetting the capacitor 508, the processor 110 can then cause the sensor 108 to integrate the light 116 reflected off the user input 112 by charging the capacitor 508 with the current I output by the photodiode 504 for the same pixel in the region of pixels 106.

At 706, the processor obtains first blocks of pixels captured by the fingerprint sensor after integrating light reflected off the input for a first amount of time since illuminating the region of pixels. For example, turning to the timing diagrams shown in FIG. 5-2, and beginning at time t_0 within the period 546, the region of pixels 106 illuminates to a first level of brightness in the first interval Int_1, which ends at time t_1. At time t_1, the processor 110, while executing the identification module 204, may determine the voltage 502 of the capacitor 508 after the sensor 108 integrates the light 116 reflected off the user input 112 for a first amount of time since the time t_0, when the display began illuminating the region of pixels.

The processor 110 can perform the next two stages, 708 and 710, simultaneously, or in-parallel. At 708, the processor 110 authenticates the user input 112 based on scoring an enrolled fingerprint, e.g., the enrolled image 206, against the first blocks obtained at stage 706. While authenticating the first blocks at 710, the processor 110 obtains additional blocks of pixels captured by the fingerprint sensor 108, after having integrated the light 116 reflected off the user input 112 for an additional amount of time since capturing the first blocks.

At 712, the processor 110 determines whether the authentication of the user input 112 based on the first blocks failed to match the enrolled fingerprint. If authentication passes and the user input 112 is authenticated by the processor 110, at 714, the processor 110 determines that authentication of the input passed and gives access to information otherwise protected by the authentication system. Otherwise, at 712, responsive to failing to authenticate the input based on the scoring of the enrolled fingerprint against the first blocks, the process moves to "A".

From "A", at stage 716, the processor 110 authenticates the user input by scoring the enrolled fingerprint against the additional blocks already captured by the fingerprint sensor while authenticating the first blocks. The additional blocks are captured by the sensor 108 and output to the processor 110 after the region of pixels 106 illuminates to a greater level of brightness than the first level of brightness, in the additional amount of time (e.g., between times t_1 and t_2) since capturing the first blocks at the time t_1. This authentication stage can occur immediately in cases where the additional blocks are already obtained while the processor 110 determines whether the authentication of the user input 112 based on the first blocks failed to match the enrolled fingerprint at the stage 712.

At 718, the processor 110 determines whether the authentication of the user input 112 based on the additional blocks failed to match the enrolled fingerprint. If authentication passes and the user input 112 is authenticated by the processor 110, then the process moves to "B". From B, the processor 110 executes the stage 714 and determines that authentication of the input passed and gives access to information otherwise protected by the authentication system. Otherwise, at 718, responsive to failing to authenticate the input based on the scoring of the enrolled fingerprint against the additional blocks, the process moves to stage 720.

At stage 720, the processor 110 determines whether a timeout alarm has expired. The timeout alarm can prevent the processor 110 from endlessly attempting to authenticate a user input, which is a way to conserve computing resources and prevent an attack. If the timeout alarm expires, for example, after two or more intervals of attempting to authenticate the user input 112, the process moves to stage 722 where the processor determines that authentication of the input failed and refrains from granting access to information otherwise protected by the authentication system.

If the timeout alarm has not expired, then at stage 724, responsive to failing to authenticate the input based on the scoring of the enrolled fingerprint against the additional blocks, the processor 110 repeatedly captures further blocks with the fingerprint sensor while simultaneously authenticating the input at the stages 716 and 718, based on scoring the enrolled fingerprint against other blocks last captured by the fingerprint sensor. For example, while the processor 110 and identification module 204 attempt to authenticate the user input 112 based on previous blocks captured during the first few intervals, the sensor 108 simultaneously captures and outputs new image data, from which to subsequently authenticate the user input 112. Given the additional integration times, each new set of blocks is likely better quality than the previous.

Figure 8:
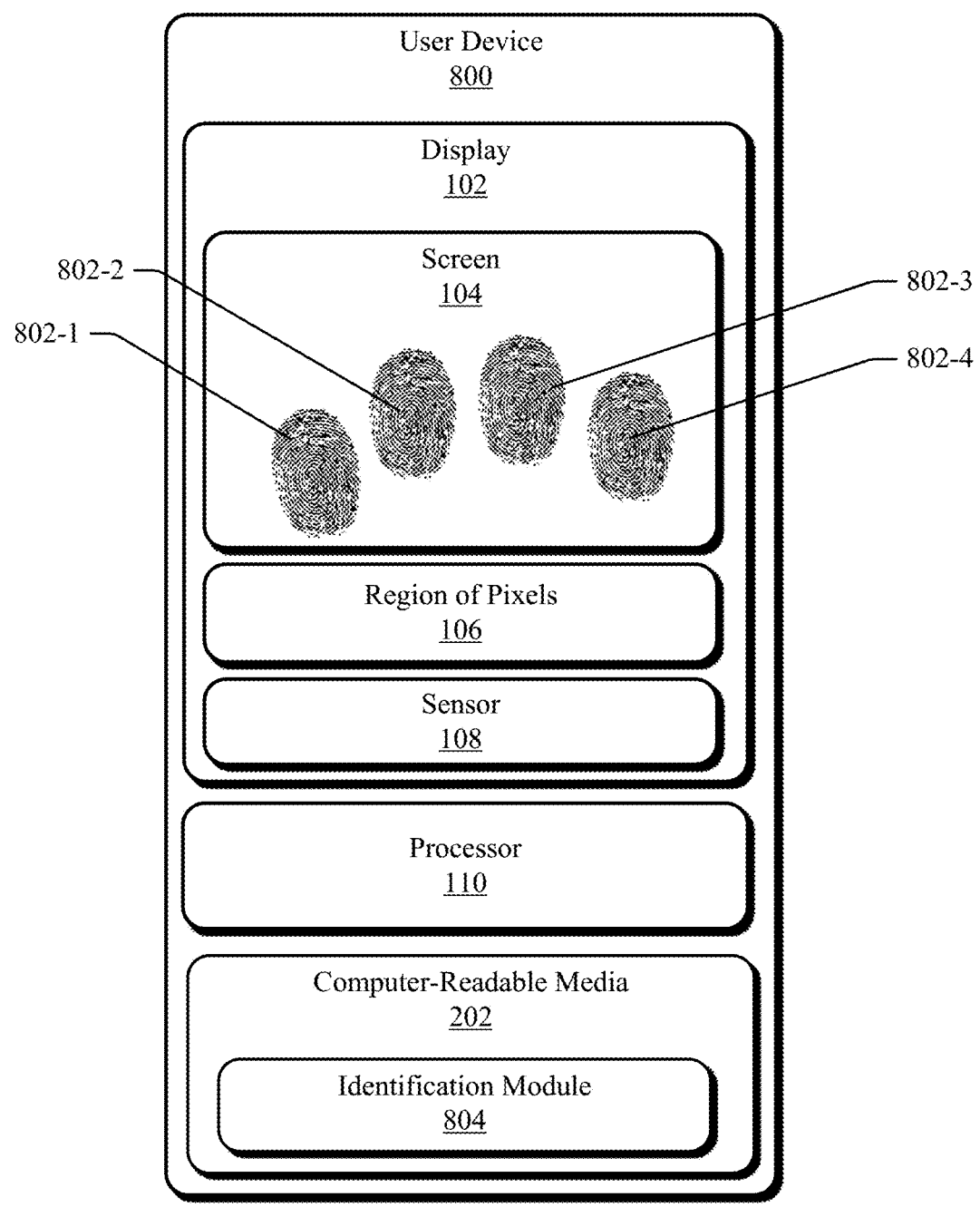
FIG. 8 illustrates another example user device that authenticates user input using an optical fingerprint sensor with varying integration times across pixels.

FIG. 8 illustrates another example user device 800 that authenticates user input using an optical fingerprint sensor with varying integration times across pixels. The user device 800 is an example of the user devices 100 and 200. The identification module 204 from FIG. 2 is replaced with an enhanced version, an identification module 804.

The identification module 804 is configured to simultaneously match multiple user inputs at once. For example, the screen 104 can be approximately sized to accommodate four fingers. The processor 110 receives an indication from the display 102 when inputs 802-1 through 802-4 are simultaneously placed on the screen 104. Just like capturing blocks of a single finger, the identification module 804 can capture blocks spanning multiple fingers. The sensor 108 can randomly or deterministically capture blocks from any area of the screen 104 that is illuminated by the region of pixels 106 and the identification module 804 can match the blocks against an enrolled image of an authorized user's hand. The identification module 804 can switch between fingers, or areas of the screen, to capture blocks from one finger to the next. An advantage is that the identification module 804 can authenticate all the fingers simultaneously, for example, after authenticating five blocks for the user input 802-1, 802-2, and 802-3, with or without authenticating the fourth user input 802-4. Some other authentication systems require authentication of an entire image or full-image matching. In addition, by authenticating at a block level rather than over an entire image, the user device 800 has better security with typically less latency than other authentication systems.

Some additional examples of optical fingerprint systems with varying integration times across pixels are described in the following section of examples.

Example 1. A computing device comprising: a display including a screen and a region of pixels configured to emit light to illuminate the screen; a fingerprint sensor configured to capture blocks of pixels within the region of pixels by integrating light reflected off an input at the screen; and a processor configured to: obtain first blocks captured by the fingerprint sensor after the fingerprint sensor integrates the light reflected off the input for a first amount of time; obtain additional blocks captured by the fingerprint sensor after the fingerprint sensor integrates the light reflected off the input for an additional amount of time since capturing the first blocks; and responsive to failing to authenticate the input based on a scoring of an enrolled fingerprint against the first blocks, authenticate the input based on scoring the enrolled fingerprint against the additional blocks obtained from the fingerprint sensor during authentication of the input from the first blocks.

Example 2. The computing device of example 1, wherein the fingerprint sensor is configured to: capture the first blocks when the region of pixels illuminates to a first level of brightness; and capture the additional blocks when the region of pixels illuminates to a greater level of brightness than the first level of brightness.

Example 3. The computing device of any of the preceding examples, wherein the first amount of time is approximately equal to the additional amount of time.

Example 4. The computing device of any of the preceding examples, wherein the first amount of time is greater than or less than the additional amount of time.

Example 5. The computing device of any of the preceding examples, wherein the processor is further configured to: responsive to failing to authenticate the input based on the scoring of the enrolled fingerprint against the additional blocks, repeatedly capture further blocks with the fingerprint sensor during authentications of the input based on scorings of the enrolled fingerprint against other blocks last captured by the fingerprint sensor.

Example 6. The computing device of any of the preceding examples, wherein: the fingerprint sensor comprises a respective capacitor and a respective photodiode for each pixel in the region of pixels; the respective photodiode for each pixel in the region of pixels is configured to output a current based on a portion of the light reflected off the input; and the respective capacitor for each pixel in the region of pixels is configured to charge from the current output by the respective photodiode for a same pixel in the region of pixels.

Example 7. The computing device of example 6, wherein the processor is further configured to: cause the fingerprint sensor to discharge the respective capacitor for each pixel in the region of pixels; and cause the fingerprint sensor to integrate the light reflected off the input by charging the respective capacitor for each pixel in the region of pixels with the current output by the respective photodiode for the same pixel in the region of pixels.

Example 8. The computing device of example 6 or 7, wherein: the fingerprint sensor further comprises a respective transistor; and the respective transistor for each pixel in the region of pixels is configured to output an indication of a voltage of the respective capacitor.

Example 9. The computing device of any of examples 6 through 8, wherein the processor is further configured to: obtain the first blocks by determining the voltage of the respective capacitor after the fingerprint sensor integrates the light reflected off the input for the first amount of time.

Example 10. A method comprising: detecting, by a processor, an input at a display; responsive to detecting the input, illuminating, by the processor, a region of pixels of the display; obtaining, by the processor, first blocks of pixels captured by a fingerprint sensor after integrating light reflected off the input for a first amount of time; authenticating, by the processor, the input based on scoring an enrolled fingerprint against the first blocks; during authentication of the first blocks, obtaining, by the processor, additional blocks of pixels captured by the fingerprint sensor after integrating the light reflected off the input for an additional amount of time; and responsive to failing to authenticate the input based on the scoring of the enrolled fingerprint against the first blocks, authenticating, by the processor, the input by scoring the enrolled fingerprint against the additional blocks already captured by the fingerprint sensor during the authentication of the first blocks.

Example 11. The method of example 10, further comprising: illuminating the region of pixels to a first level of brightness in the first amount of time; and illuminating the region of pixels to a greater level of brightness than the first level of brightness in the additional amount of time.

Example 12. The method of any of the preceding examples, further comprising: responsive to failing to authenticate the input based on the scoring of the enrolled fingerprint against the additional blocks, repeatedly capturing further blocks with the fingerprint sensor during authentications of the input based on scorings of the enrolled fingerprint against other blocks last captured by the fingerprint sensor.

Example 13. The method of any of the preceding examples, wherein: the fingerprint sensor comprises a respective capacitor and a respective photodiode for each pixel in the region of pixels; the respective photodiode for each pixel in the region of pixels is configured to output current based on a portion of the light reflected off the input; and the respective capacitor for each pixel in the region of pixels is configured to charge from the current output by the respective photodiode for a same pixel in the region of pixels.

Example 14. The method of example 13, further comprising: causing the fingerprint sensor to discharge the respective capacitor for each pixel in the region of pixels; and causing the fingerprint sensor to integrate the light reflected off the input by charging the respective capacitor for each pixel in the region of pixels with the current output by the respective photodiode for the same pixel in the region of pixels.

Example 15. The method of example 13 or 14, wherein: the fingerprint sensor further comprises a respective transistor; and the respective transistor for each pixel in the region of pixels is configured to output an indication of a voltage of the respective capacitor.

Example 16. The method of any of the examples 13 through 15, wherein obtaining the first blocks comprises determining the voltage of the respective capacitor after the fingerprint sensor integrates the light reflected off the input for a first amount of time since the display began illuminating the region of pixels.

Example 17. An apparatus comprising: a light source including a region of pixels; and an optical sensor configured to: integrate, over a period of time, light reflecting off input to the region of pixels to capture initial blocks of pixels at an initial interval in the period of time; and simultaneously output previous blocks of pixels captured at a previous interval in the period of time.

Example 18. The apparatus of example 17, wherein the optical sensor is further configured to: capture the initial blocks when the light source illuminates the region of pixels to an initial level of brightness; and capture the previous blocks when the light source illuminates the region of pixels to a lower level of brightness than the initial level of brightness.

Example 19. The apparatus of example 18, wherein the optical sensor is configured to capture the initial blocks or the previous blocks as images of features of the input including fingerprints, handprints, footprints, retinal features, or facial features.

Example 20. The apparatus of any of the preceding examples, wherein the light source comprises a display including one or more organic light emitting diodes at each pixel in the region of the pixels.

Example 21. A system comprising means for performing the method of any of the examples 11-16.

Example 22. A computer-readable storage medium comprising instructions, which when executed, configured a processor to perform the method of any of the examples 11-16.

While various operations and embodiments of optical fingerprint systems with varying integration times across pixels are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:

1. A computing device comprising:
a display including a screen and a region of pixels configured to emit light to illuminate the screen;
a fingerprint sensor configured to capture blocks of pixels within the region of pixels by integrating light reflected off an input at the screen; and
a processor configured to:
obtain first blocks captured by the fingerprint sensor after the fingerprint sensor integrates the light reflected off the input for a first amount of time, the first blocks including a first subset of pixels within the region of pixels;
obtain additional blocks captured by the fingerprint sensor after the fingerprint sensor integrates the light reflected off the input for an additional amount of time since capturing the first blocks, the additional blocks including an additional subset of pixels within the region of pixels that is different than the first subset of pixels; and
responsive to failing to authenticate the input based on a scoring of an enrolled fingerprint against the first blocks, authenticate the input based on scoring the enrolled fingerprint against the additional blocks obtained from the fingerprint sensor during authentication of the input from the first blocks.

2. The computing device of claim 1, wherein the fingerprint sensor is configured to:
capture the first blocks when the region of pixels illuminates to a first level of brightness; and
capture the additional blocks when the region of pixels illuminates to a greater level of brightness than the first level of brightness.

3. The computing device of claim 1, wherein the first amount of time is approximately equal to the additional amount of time.

4. The computing device of claim 1, wherein the first amount of time is greater than or less than the additional amount of time.

5. The computing device of claim 1, wherein the processor is further configured to:
responsive to failing to authenticate the input based on the scoring of the enrolled fingerprint against the additional blocks, repeatedly capture further blocks with the fingerprint sensor during authentications of the input based on scorings of the enrolled fingerprint against other blocks last captured by the fingerprint sensor, the further blocks including a further subset of pixels within the region of pixels that is different than the first subset of pixels and the additional subset of pixels.

6. The computing device of claim 1, wherein:
the fingerprint sensor comprises a respective capacitor and a respective photodiode for each pixel in the region of pixels;
the respective photodiode for each pixel in the region of pixels is configured to output a current based on a portion of the light reflected off the input; and
the respective capacitor for each pixel in the region of pixels is configured to charge from the current output by the respective photodiode for a same pixel in the region of pixels.

7. The computing device of claim 6, wherein the processor is further configured to:
cause the fingerprint sensor to discharge the respective capacitor for each pixel in the region of pixels; and
cause the fingerprint sensor to integrate the light reflected off the input by charging the respective capacitor for each pixel in the region of pixels with the current output by the respective photodiode for the same pixel in the region of pixels.

8. The computing device of claim 6, wherein:
the fingerprint sensor further comprises a respective transistor; and
the respective transistor for each pixel in the region of pixels is configured to output an indication of a voltage of the respective capacitor.

9. The computing device of claim 6, wherein the processor is further configured to:
obtain the first blocks by determining the voltage of the respective capacitor after the fingerprint sensor integrates the light reflected off the input for the first amount of time.

10. A method comprising:
detecting, by a processor, an input at a display;
responsive to detecting the input, illuminating, by the processor, a region of pixels of the display;
obtaining, by the processor, first blocks of pixels captured by a fingerprint sensor after integrating light reflected off the input for a first amount of time, the first blocks including a first subset of pixels within the region of pixels;
authenticating, by the processor, the input based on scoring an enrolled fingerprint against the first blocks;
during authentication of the first blocks, obtaining, by the processor, additional blocks of pixels captured by the fingerprint sensor after integrating the light reflected off the input for an additional amount of time, the additional blocks including an additional subset of pixels within the region of pixels that is different than the first subset of pixels; and
responsive to failing to authenticate the input based on the scoring of the enrolled fingerprint against the first blocks, authenticating, by the processor, the input by scoring the enrolled fingerprint against the additional blocks already captured by the fingerprint sensor during the authentication of the first blocks.

11. The method of claim 10, further comprising:
illuminating the region of pixels to a first level of brightness in the first amount of time; and
illuminating the region of pixels to a greater level of brightness than the first level of brightness in the additional amount of time.

12. The method of claim 10, further comprising:
responsive to failing to authenticate the input based on the scoring of the enrolled fingerprint against the additional blocks, repeatedly capturing further blocks with the fingerprint sensor during authentications of the input based on scorings of the enrolled fingerprint against other blocks last captured by the fingerprint sensor, the further blocks including a further subset of pixels within the region of pixels that is different than the first subset of pixels and the additional subset of pixels.

13. The method of claim 10, wherein:
the fingerprint sensor comprises a respective capacitor and a respective photodiode for each pixel in the region of pixels;
the respective photodiode for each pixel in the region of pixels is configured to output current based on a portion of the light reflected off the input; and
the respective capacitor for each pixel in the region of pixels is configured to charge from the current output by the respective photodiode for a same pixel in the region of pixels.

14. The method of claim 13, further comprising:
causing the fingerprint sensor to discharge the respective capacitor for each pixel in the region of pixels; and
causing the fingerprint sensor to integrate the light reflected off the input by charging the respective capacitor for each pixel in the region of pixels with the current output by the respective photodiode for the same pixel in the region of pixels.

15. The method of claim 13, wherein:
the fingerprint sensor further comprises a respective transistor; and
the respective transistor for each pixel in the region of pixels is configured to output an indication of a voltage of the respective capacitor.

16. The method of claim 13, wherein obtaining the first blocks comprises determining the voltage of the respective capacitor after the fingerprint sensor integrates the light reflected off the input for a first amount of time since the display began illuminating the region of pixels.

17. An apparatus comprising:
a light source including a region of pixels;
an optical sensor configured to:
integrate, over a period of time, light reflecting off input to the region of pixels to capture first blocks of pixels at a first interval in the period of time, the first blocks including a first subset of pixels within the region of pixels;
integrate, over the period of time, light reflecting off input to the region of pixels to capture second blocks of pixels at a second interval in the period of time, the second blocks including a second subset of pixels within the region of pixels that is different than the first subset of pixels; and
simultaneously output the first blocks and the second blocks of pixels captured at a previous interval in the period of time; and
a processor configured to:
obtain the first blocks and the second blocks of pixels; and
responsive to failing to authenticate the input based on a scoring of an enrolled fingerprint against the first blocks, authenticate the input based on scoring the enrolled fingerprint against the second blocks.

18. The apparatus of claim 17, wherein the optical sensor is further configured to:
capture the first blocks when the light source illuminates the region of pixels to a first level of brightness; and
capture the second blocks when the light source illuminates the region of pixels to a second level of brightness, the second level of brightness having a brightness level lower than the first level of brightness.

19. The apparatus of claim 18, wherein the optical sensor is further configured to capture the first blocks or the second blocks as images of features of the input including fingerprints, handprints, footprints, retinal features, or facial features.

20. The apparatus of claim 17, wherein the light source comprises a display including one or more organic light emitting diodes at each pixel in the region of the pixels.

* * * * *